(12) United States Patent
Sun et al.

(10) Patent No.: US 8,514,829 B2
(45) Date of Patent: Aug. 20, 2013

(54) CENTER FREQUENCY CONTROL FOR WIRELESS COMMUNICATION

(75) Inventors: Jing Sun, San Diego, CA (US); Aamod Khandekar, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 904 days.

(21) Appl. No.: 12/238,832

(22) Filed: Sep. 26, 2008

(65) Prior Publication Data

US 2009/0093216 A1 Apr. 9, 2009

Related U.S. Application Data

(60) Provisional application No. 60/978,083, filed on Oct. 5, 2007.

(51) Int. Cl.
*H04J 1/00* (2006.01)
*H04L 5/00* (2006.01)

(52) U.S. Cl.
CPC ................................. *H04L 5/0007* (2013.01)
USPC ........................................... 370/343; 455/62

(58) Field of Classification Search
CPC .................................................... H04L 5/0007
USPC ........ 370/252, 328, 338, 203–210, 341–347; 455/62, 216, 226; 375/260–265
See application file for complete search history.

(56) References Cited

U.S. PATENT DOCUMENTS

| 4,918,532 | A | 4/1990 | O'Connor |
| 5,241,687 | A | 8/1993 | Short |
| 6,301,306 | B1 | 10/2001 | McDonald et al. |
| 7,417,495 | B2 | 8/2008 | Li |
| 2006/0153141 | A1 | 7/2006 | Hirano |
| 2007/0298780 | A1 | 12/2007 | Lindoff et al. |
| 2008/0192807 | A1* | 8/2008 | Castaneda et al. ............ 375/136 |

FOREIGN PATENT DOCUMENTS

| GB | 2392584 | 3/2004 |
| WO | WO9933204 A1 | 7/1999 |

OTHER PUBLICATIONS

International Search Report & Written Opinion—PCT/US2009/078804, International Search Authority—European Patent Office—Mar. 10, 2009.

\* cited by examiner

*Primary Examiner* — Kan Yuen
(74) *Attorney, Agent, or Firm* — Howard Seo (57) ABSTRACT

The method and apparatus as described are directed toward techniques and mechanisms to improve efficient wireless network implementation, including obtaining one specification including a center frequency definition, determining, based on the specification, a center frequency of at least one carrier used to operate on the wireless communication system, determining an amount of dithering to add to the center frequency, and setting the center frequency to be multiples of sub-carrier spacing by adding the dithering.

28 Claims, 9 Drawing Sheets

CENTER FREQUENCY CONTROL FOR WIRELESS COMMUNICATION

CROSS-REFERENCE TO RELATED APPLICATIONS

The present Application for Patent claims priority to Provisional Application No. 60/978,083 entitled "BAND CLASS OF OFDM SYSTEM" which was filed Oct. 5, 2007, and assigned to the assignee hereof and hereby expressly incorporated by reference herein.

BACKGROUND

1. Field

The present aspects relate to wireless communication devices, and more particularly to apparatus and methods for decreasing the complexity of wireless communication devices through center frequency control.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Optimization of network coverage and service quality are constant goals for wireless network operators. Superior coverage and service quality results in enhanced user experiences, greater throughput, and ultimately increased revenue. One way to achieve superior coverage and service quality is through decreased network and mobile device complexity. Consequently, it would be desirable to have a method and/or apparatus for decreasing network and mobile device complexity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The subject disclosure provides for controlling center frequencies in a multi-carrier wireless network by adding dithering. In some aspects, disclosed is a method for obtaining one specification including a center frequency definition, determining, based on the specification, a center frequency of at least one carrier used to operate on the wireless communication system, determining an amount of dithering to add to the center frequency, and setting the center frequency to be multiples of sub-carrier spacing by adding the dithering.

In other aspects disclosed is an apparatus that facilitates wireless communication in a multi-carrier network. The apparatus can include a memory that retains instructions related to obtaining at least one specification, wherein the specification includes at least one center frequency definition, analyzing the specification and determining a center frequency of at least one carrier, wherein the carrier operates on the wireless communication system, determining an amount dithering to add to the center frequency, and setting the center frequency to be multiples of the sub-carrier spacing by adding the dithering, and a processor, coupled to the memory, configured to execute the instructions retained in the memory.

According to still other aspects, provided is a wireless communication apparatus that includes means for obtaining at least one specification, wherein the specification includes at least one center frequency definition, means for analyzing the specification and determining a center frequency of at least one carrier, wherein the carrier operates on the wireless communication system, means for determining an amount of dithering to add to the center frequency, and means for setting the center frequency to be multiples of the sub-carrier spacing by adding the dithering.

In one or more other aspects, disclosed is an computer program product that contains a computer-readable medium comprising a first set of codes for causing at least one computer to obtain at least one specification, wherein the specification includes at least one center frequency definition, a second set of codes for causing the at least one computer to analyze the specification and determining a center frequency of at least one carrier, wherein the carrier operates on the wireless communication system, a third set of codes for causing the at least one computer to determine an amount of dithering to add to the center frequency, and a fourth set of codes for causing the at least one computer to set the center frequency to be multiples of the sub-carrier spacing based at least in part on adding the dithering.

In other aspects disclosed is at least one processor configured to facilitate wireless communications, comprising a first module for obtaining one specification including a center frequency definition, a second module for determining, based on the specification, a center frequency of at least one carrier used to operate on the wireless communication system, a third module for determining an amount of dithering to add to the center frequency, and a fourth module for setting the center frequency to be multiples of sub-carrier spacing by adding the dithering.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
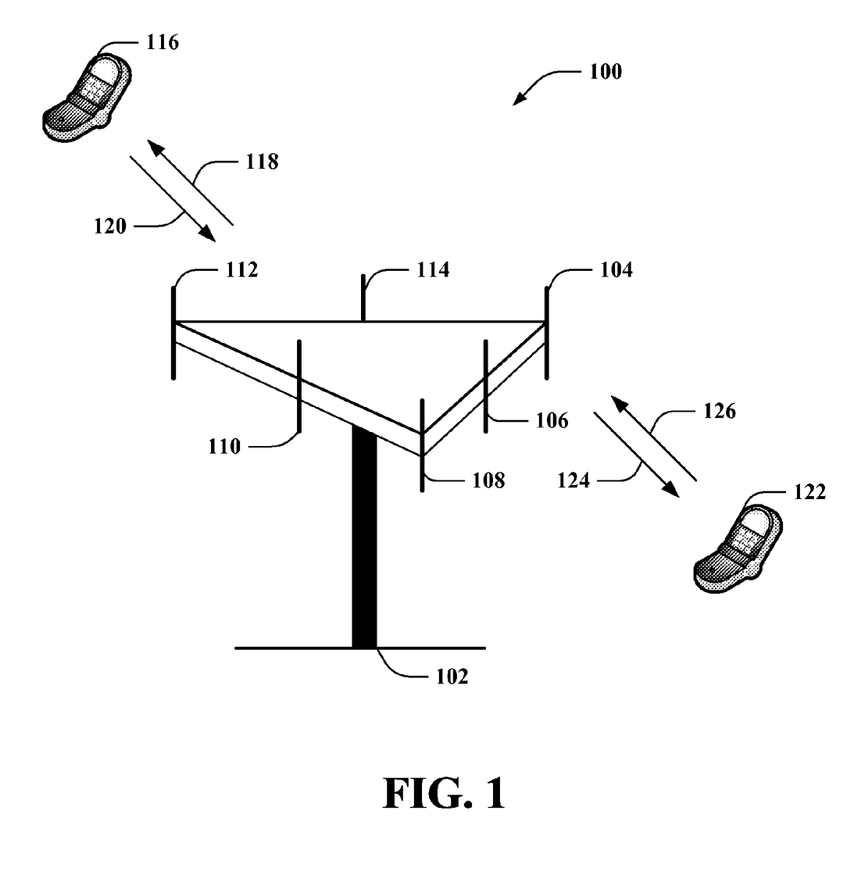
FIG. 1 illustrates an exemplary multiple access wireless communication system in accordance with an aspect of the subject specification.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
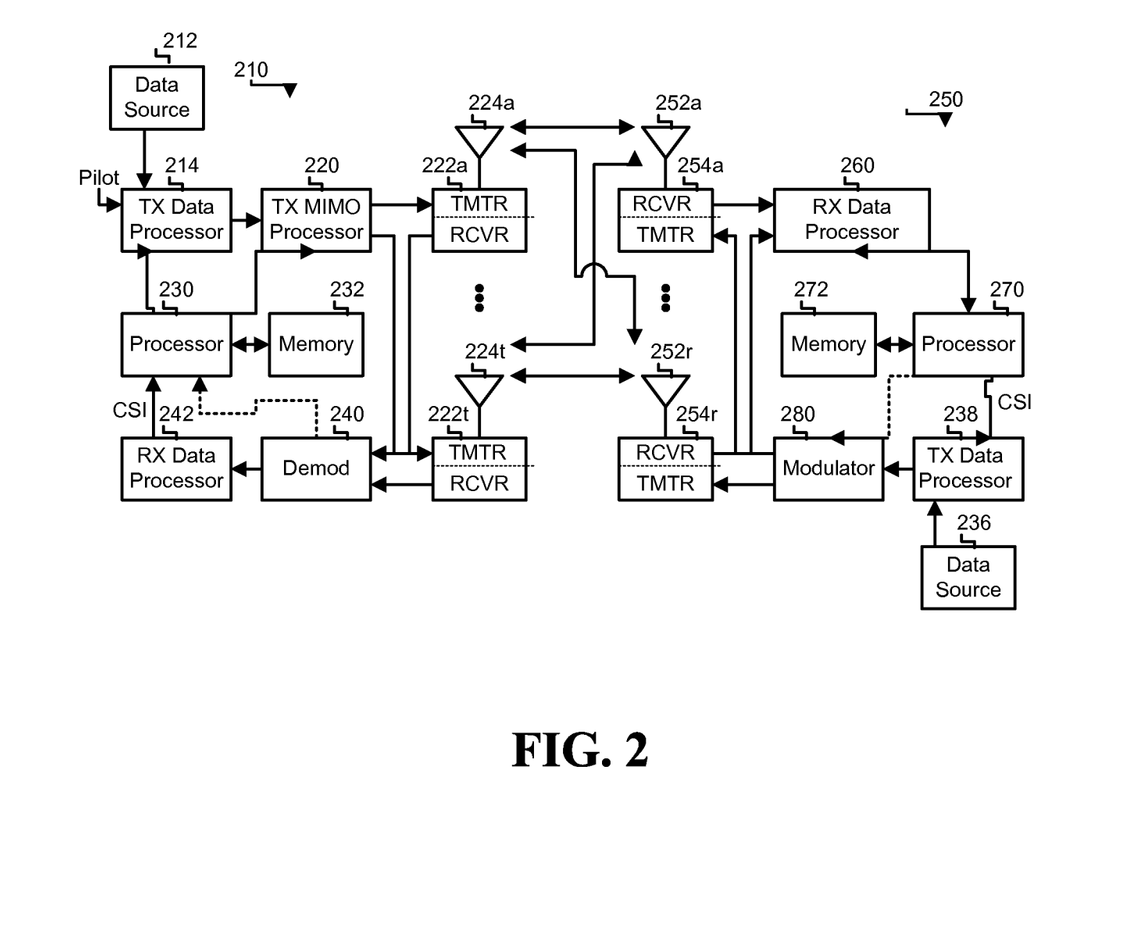
FIG. 2 illustrates a general block diagram of a communication system in accordance with an aspect of the subject specification.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
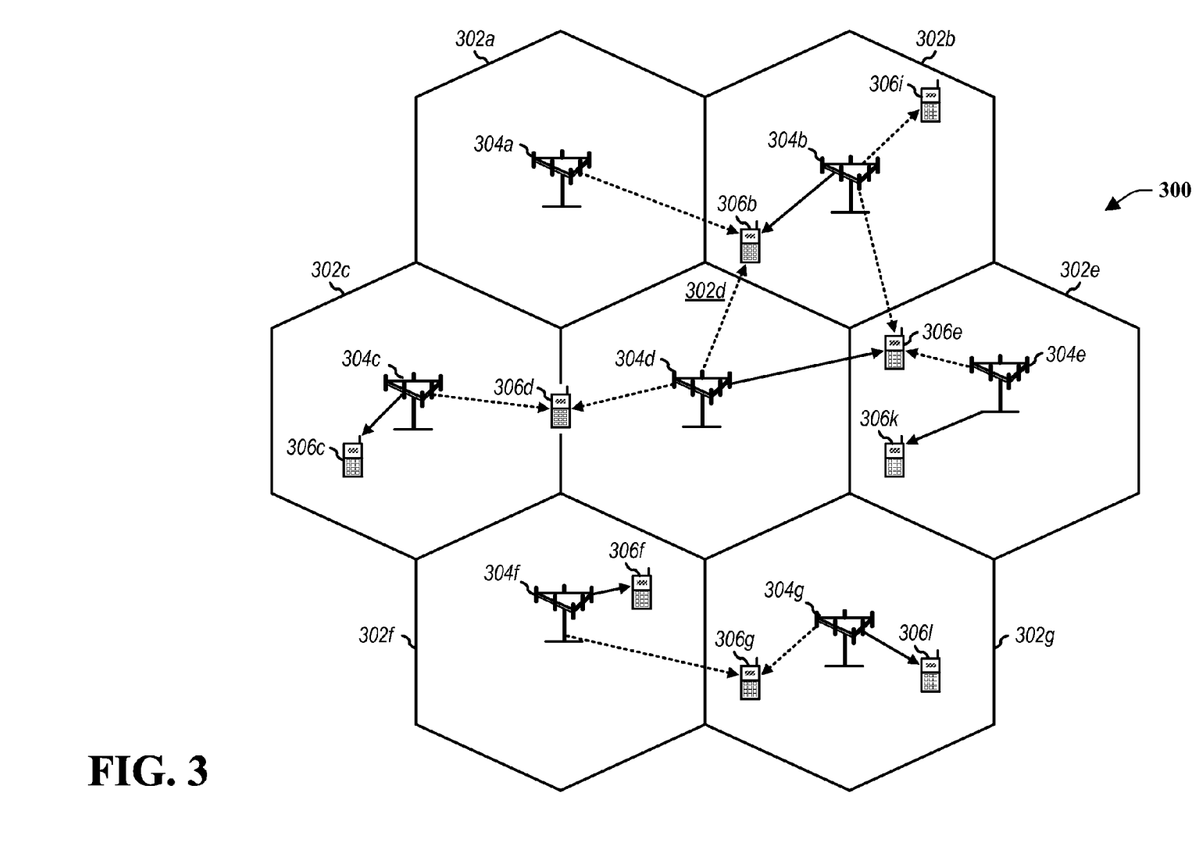
FIG. 3 illustrates an exemplary wireless communication system in accordance with an aspect of the subject specification.

FIG. 3 illustrates an exemplary wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

The cells 302 can provide coverage via a plurality of networks, such as GSM/GPRS/Edge network (hereinafter referred to as "2G network"), and/or UMTS network (hereinafter referred to as "WCDMA coverage," "3G network," or simply as "3G"). The system 300 can have a first network in the cells, wherein the first network is the most readily available network, or can be considered the "fall back" technology having the greatest coverage area. In addition, the system 300 may have a second network that is available in a subset of the cells 302, and is not as readily available as the first network. For example, the second network may not be available in each cell 302, and/or may not cover the entire area of the cells 302 in which it is available. Users leaving the second network are provided coverage by the first network. For instance, the system 300 can include 2G and 3G networks, wherein the 2G network covers the entire system 300, and the 3G network is available in some locations throughout the system 300.

Figure 4:
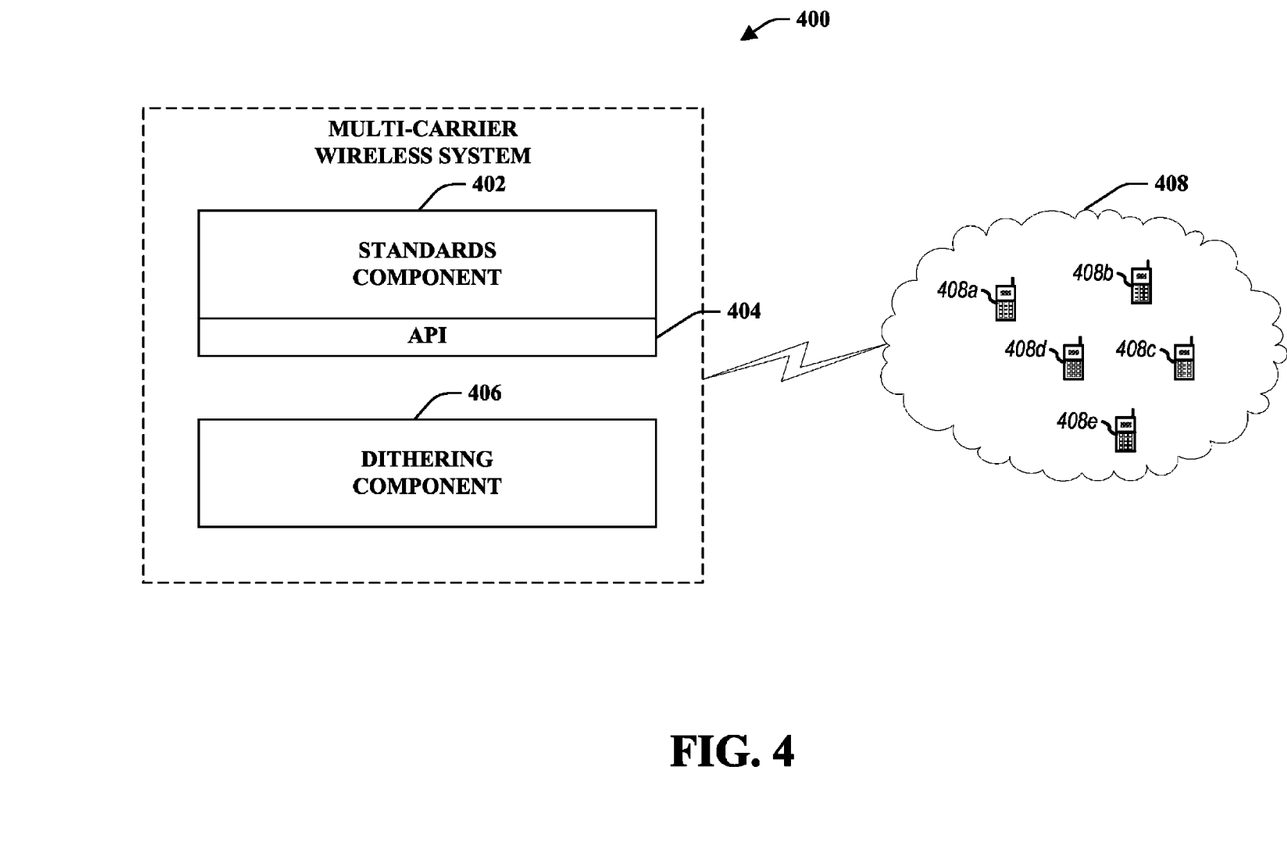
FIG. 4 is an example general component block diagram illustrating an apparatus for setting the center frequency in a multi-carrier wireless system in accordance with an aspect of the subject specification.

Referring now to FIG. 4, an example apparatus for setting the center frequency of a carrier in a multi-carrier wireless communication system 400 is shown in accordance with one or more embodiments of the present innovation. The wireless communication system 400 includes a multi-carrier wireless communication system 400, including a standards component 402 having an API 404, and a dithering component 406. The standards component 402 includes one or more specifications (e.g. spec, standard, etc.). Additionally, the standards component 402 can determine the center frequency of one or more legacy specifications, wherein the legacy specifications can include specifications for a GSM/WCDMA network, CDMA2000 1x network, or an EV/DO network. It is to be appreciated that this is but one embodiment of the subject innovation, and a plurality of additional or alternative embodiments are possible within the scope and spirit of this disclosure. Furthermore, it is to be appreciated that the structure of this embodiment is presented in the current form for simplicity of explanation. For instance, a device (e.g. base station, mobile device, etc.) operating on the multi-carrier wireless communication system 400 can be preconfigured (e.g. built) to comply with one or more given specifications.

The specifications contain, define, or otherwise set forth the center frequency of the carriers operating on the wireless communication system 400. For example, in a multi-carrier orthogonal frequency-division multiplexing (OFDM) system the center frequency spacing between component carriers can be defined in the specification as multiples of the sub-carrier spacing. In this way, the complexity of modulation/demodulation can be simplified as a single Fast Fourier Transform (FFT) component can be used to modulate/demodulate all component carriers. For instance, for a $3^{rd}$ Generation Partnership Project (3GPP) Long Term Evolution (LTE) network the carrier spacing can be multiple of 15 KHz, and for a $3^{rd}$ Generation Partnership Project 2 (3gpp2) Ultra Mobile Broadband (UMB) network the carrier spacing can be multiple of 9.6 KHz.

The sub-carrier spacing is an OFDM modulation parameter, and the carrier spacing can be defined as a multiple of the sub-carrier spacing for ease of implementation. In addition, in legacy wireless communication systems the center frequency is defined in the specification based on a given raster. For instance, in a legacy GSM network the center frequency is multiples of 100 KHz, and for a 3gpp2 legacy network the center frequency can be multiples of 25 KHz, 30 KHz, or 50 KHz depending on the band class. It is to be appreciated that the standards component can be a storage medium, such as a data store, memory, and so forth.

Additionally or alternatively, the standards component 402 can include an application programming interface (API) 406 that receives, obtains, or otherwise acquires the standards from one or more external sources. The API 404 includes any suitable and/or necessary adapters, connectors, channels, communication paths, etc. to integrate the standards component 402 into virtually any operating and/or database system (s). For instance, the standards component 402 can obtain data relating to the standards from an Internet source (e.g. website), or a system operator, and so forth.

The dithering component 406 obtains the center frequency of one or more of the carriers from the standards component 402. Returning to the previous example, it can be appreciated that a conflict can exist between the center frequencies of a multi-carrier OFDM system and one or more legacy systems. For example, in a legacy GSM/WCDMA network the center frequencies of the carriers can be multiples of 100 KHz, while in an OFDM LTE network the center frequencies can be multiples of 15 KHz. Clearly, the center frequencies of the legacy system and the OFDM systems cannot be satisfied simultaneously. The dithering component 406 can add dithering to the center frequencies of the multi-carrier system such that the center frequency can be within half of the sub-carrier spacing to that of the legacy system. For instance, the dithering component 406 can add dithering of the carriers in an OFDM GSM/WCDMA network such that the center frequency is at most 7.5 KHz (or 15 KHz/2) away. Similarly, the dithering component 406 can add dithering of the carriers in a 3gpp2 network to be at most 4.8 KHz (or 9.2 KHz/2) away. Typically, a current mobile device (e.g. UE 408a-408e) supports both the present system and one or more legacy systems. By using dithering, the same center frequency can be used to demodulate both legacy system and the new system, as the difference in the center frequencies is well within the frequency tracking loop capability of the mobile device. Therefore, reducing the complexity required for modulation and/or demodulation.

It is to be appreciated that the dithering component 406 can determine the center frequencies using a plurality of techniques. For instance, the dithering component 406 can achieve the center frequencies (CF) using the equation:

$$CF = \text{round}((f_{cn} - f_o)/f_{cs}) \cdot (f_{cs} + f_o) \quad \text{Equation (1)}$$

where $f_{cn}$ is the center frequency of an original channel number, $f_o$ is the frequency offset, and $f_{cs}$ is the sub-carrier spacing. For instance, the original cdma2000-1channel number may be used for an OFDM system, with different channel numbers added for the reverse link (RL). The dithering component 406 can achieve the center frequency of a particular channel n in the OFDM system by starting from the original cdma2000-1x channel number and using equation 1, wherein the sub-carrier spacing, $f_{cs}$, of the channel is 9.6 KHz. It is to be appreciated that $f_o$ may be different for a forward link (FL) and a RL, but can still follow a duplexer gap (e.g. the left end of the FL and RL band respectively). Therefore, the channels will be in the form of the $f_o + f_{cn} \cdot k$, where k is an integer not less than 0.

Figure 5:
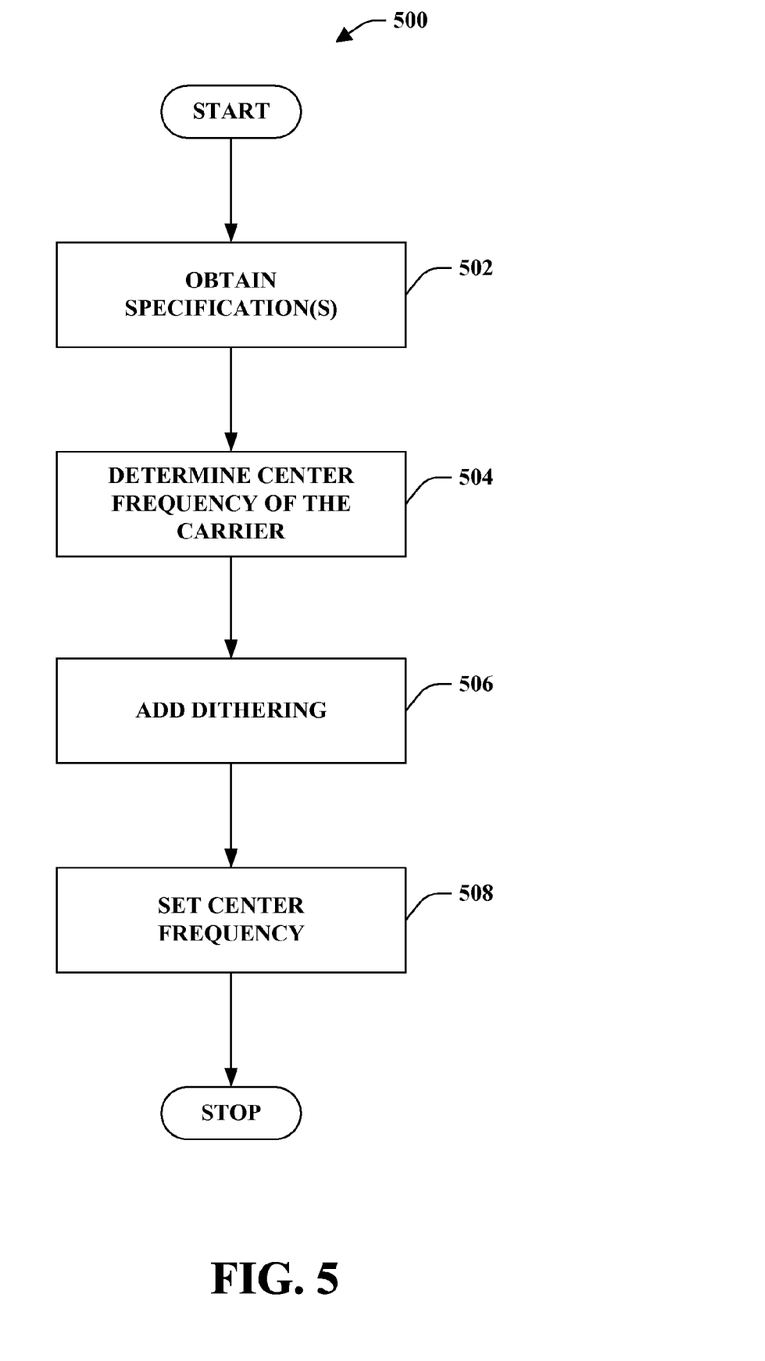
FIG. 5 is a flow chart illustrating a generalized methodology of setting the center frequency in a multi-carrier wireless communication system in accordance with an aspect of the subject specification.

In view of the exemplary systems described supra, methodologies that may be implemented in accordance with the disclosed subject matter will be better appreciated with reference to the flow chart of FIG. 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a generalized methodology 500 that facilitates setting the center frequency of a carrier in a wireless communication system in accordance with one or more embodiments of the subject innovations. At 502, one or more specifications (e.g. standards) are obtained. As previously discussed, the specifications contain, define, or otherwise set forth the center frequency and carrier spacing for the carriers operating on the wireless communication system.

At 504, the specifications are analyzed in order to determine an initial center frequency and/or carrier spacing of the carriers operating on a multi-carrier wireless system. For instance, as previously discussed, in an LTE network the carrier spacing can be multiple of 15 KHz, and for an UMB network the carrier spacing can be multiple of 9.6 KHz.

At 506, dithering can be added in order to set, control, or otherwise determine the center frequency for one or more carriers. Controlling the dithering allows for backwards compatibility and efficient implementation of a wireless communication system. For instance, a system operator may want to improve a wireless communication system by using an OFDM system that has data rates greater than the system is currently employing. The system operator can switch channel cards to operate on the OFDM system with higher data rates, and maintain backward compatibility without the need for frequency retuning and so forth. By adding the dithering the system operator can have multiple carriers in the same base station that can be demodulated by the associated mobile devices (e.g. UEs) using comparatively low complexity circuits. Adding the dithering enables determination of one or more center frequencies that the associated legacy UEs and current UEs can operate on concurrently. The center frequency is set at 508.

Figure 6:
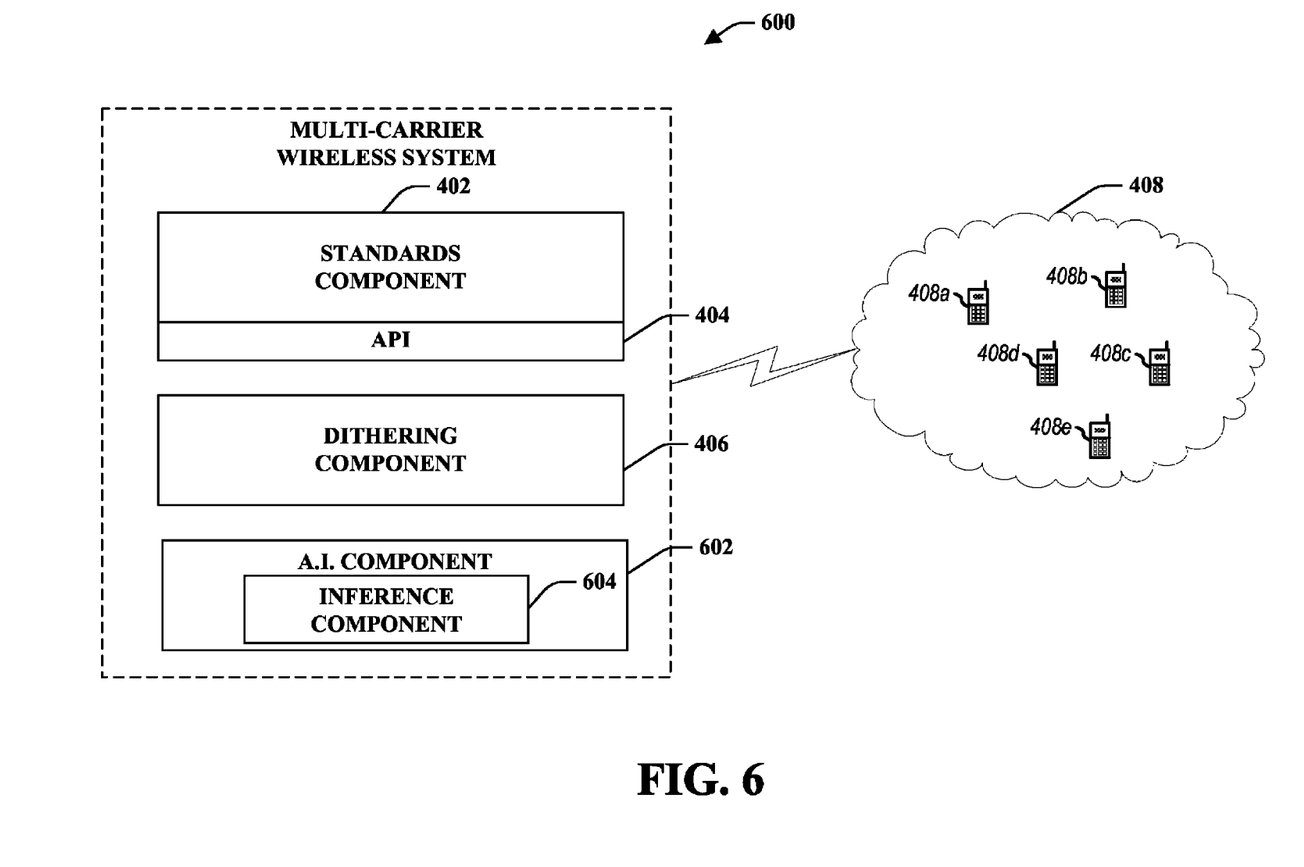
FIG. 6 illustrates an approach that employs an artificial intelligence component which facilitates automating one or more features in accordance with an alternative embodiment.

FIG. 6 illustrates an approach 600 that employs an artificial intelligence (AI) component 602 which facilitates automating one or more features in accordance with the subject invention. The subject invention (e.g., in connection with inferring) can employ various AI-based schemes for carrying out various aspects thereof. For example, a process for adding dithering could be facilitated by artificial intelligence.

A classifier is a function that maps an input attribute vector, $x = (x1, x2, x3, x4, xn)$, to a confidence that the input belongs to a class, that is, $f(x) = \text{confidence}(\text{class})$. Such classification can employ a probabilistic and/or statistical-based analysis (e.g., factoring into the analysis utilities and costs) to prognose or infer an action that a user desires to be automatically performed. For instance, depending on the implementation a confidence can be assigned to the set of criteria, and an inference can be made as to the criteria that should be used as triggers for adding dithering.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., primary versus secondary, static versus dynamic, . . . ), and at what time of day to implement tighter criteria controls (e.g., in the evening when system performance would be less impacted).

Figure 7:
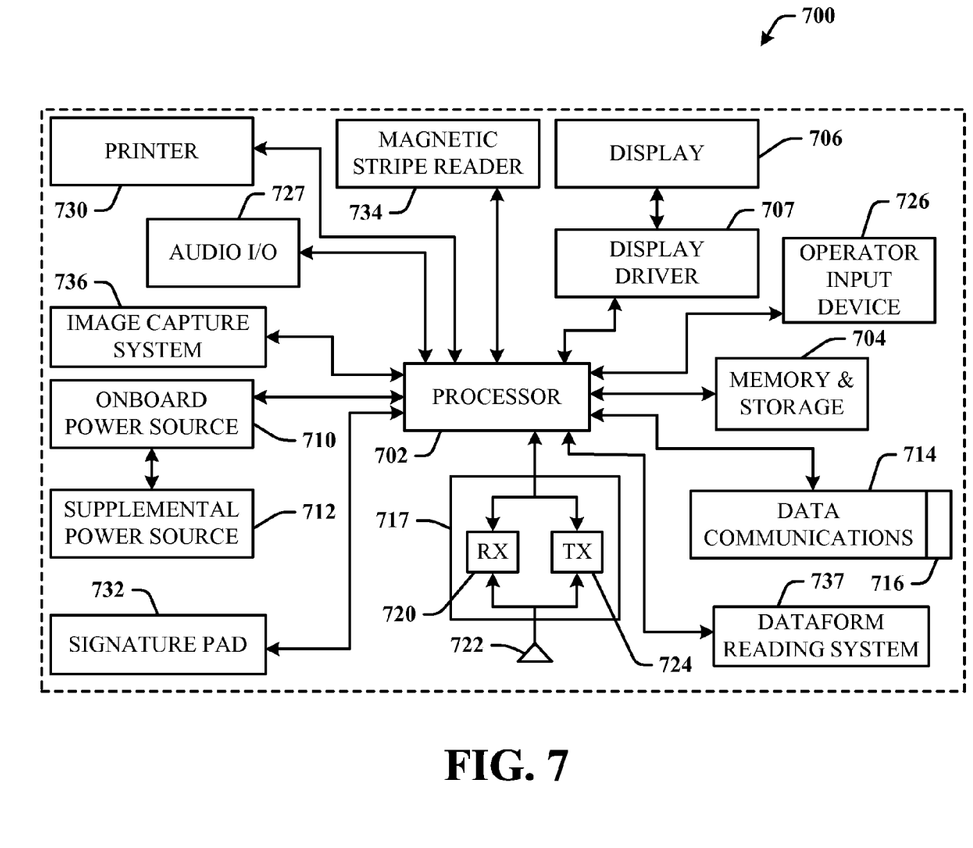
FIG. 7 illustrates an exemplary device operative to execute the one or more embodiments disclosed herein.

Referring now to FIG. 7, illustrated is a schematic block diagram of a portable hand-held terminal device 700 according to one aspect of the invention, in which a processor 702 is responsible for controlling the general operation of the device 700. The processor 702 is programmed to control and operate the various components within the device 700 in order to carry out the various functions described herein. The processor 702 can be any of a plurality of suitable processors. The manner in which the processor 702 can be programmed to carry out the functions relating to the invention will be readily apparent to those having ordinary skill in the art based on the description provided herein.

A memory 704 connected to the processor 702 serves to store program code executed by the processor 702, and serves as a storage means for storing information such as user credential and receipt transaction information and the like. The memory 704 can be a nonvolatile memory suitably adapted to store at least a complete set of the information that is displayed. Thus, the memory 704 can include a RAM or flash memory for high-speed access by the processor 702 and/or a mass storage memory, e.g., a micro drive capable of storing gigabytes of data that comprises text, images, audio, and video content. According to one aspect, the memory 704 has sufficient storage capacity to store multiple sets of information, and the processor 702 could include a program for alternating or cycling between various sets of display information.

A display 706 is coupled to the processor 702 via a display driver system 708. The display 706 can be a color liquid crystal display (LCD), plasma display, or the like. In this example, the display 706 is a ¼ VGA display with sixteen levels of gray scale. The display 706 functions to present data, graphics, or other information content. For example, the display 706 can display a set of customer information, which is displayed to the operator and can be transmitted over a system backbone (not shown). Additionally, the display 706 can display a variety of functions that control the execution of the device 700. The display 706 is capable of displaying both alphanumeric and graphical characters.

Power is provided to the processor 702 and other components forming the hand-held device 700 by an onboard power system 710 (e.g., a battery pack). In the event that the power system 710 fails or becomes disconnected from the device 700, a supplemental power source 712 can be employed to provide power to the processor 702 and to charge the onboard power system 710. The processor 702 of the device 700 induces a sleep mode to reduce the current draw upon detection of an anticipated power failure.

The terminal 700 includes a communication subsystem 714 that includes a data communication port 716, which is employed to interface the processor 702 with a remote computer. The port 716 can include at least one of Universal Serial Bus (USB) and IEEE 1394 serial communications capabilities. Other technologies can also be included, for example, infrared communication utilizing an infrared data port.

The device 700 can also include a radio frequency (RF) transceiver section 718 in operative communication with the processor 702. The RF section 718 includes an RF receiver 720, which receives RF signals from a remote device via an antenna 722 and demodulates the signal to obtain digital information modulated therein. The RF section 718 also includes an RF transmitter 724 for transmitting information to a remote device, for example, in response to manual user input via a user input device 726 (e.g., a keypad) or automatically in response to the completion of a transaction or other predetermined and programmed criteria. The transceiver section 718 facilitates communication with a transponder system, for example, either passive or active, that is in use with product or item RF tags. The processor 702 signals (or pulses) the remote transponder system via the transceiver 718, and detects the return signal in order to read the contents of the tag memory. In one implementation, the RF section 718 further facilitates telephone communications using the device 700. In furtherance thereof, an audio I/O section 728 is provided as controlled by the processor 702 to process voice input from a microphone (or similar audio input device) and audio output signals (from a speaker or similar audio output device).

In another implementation, the device 700 can provide voice recognition capabilities such that when the device 700 is used simply as a voice recorder, the processor 702 can facilitate high-speed conversion of the voice signals into text content for local editing and review, and/or later download to a remote system, such as a computer word processor. Similarly, the converted voice signals can be used to control the device 700 instead of using manual entry via the keypad 726.

Onboard peripheral devices, such as a printer 730, signature pad 732, and a magnetic strip reader 734 can also be provided within the housing of the device 700 or accommodated externally through one or more of the external port interfaces 716.

The device 700 can also include an image capture system 736 such that the user can record images and/or short movies for storage by the device 700 and presentation by the display 706. Additionally, a dataform reading system 738 is included for scanning dataforms. It is to be appreciated that these imaging systems (736 and 738) can be a single system capable of performing both functions.

Figure 8:
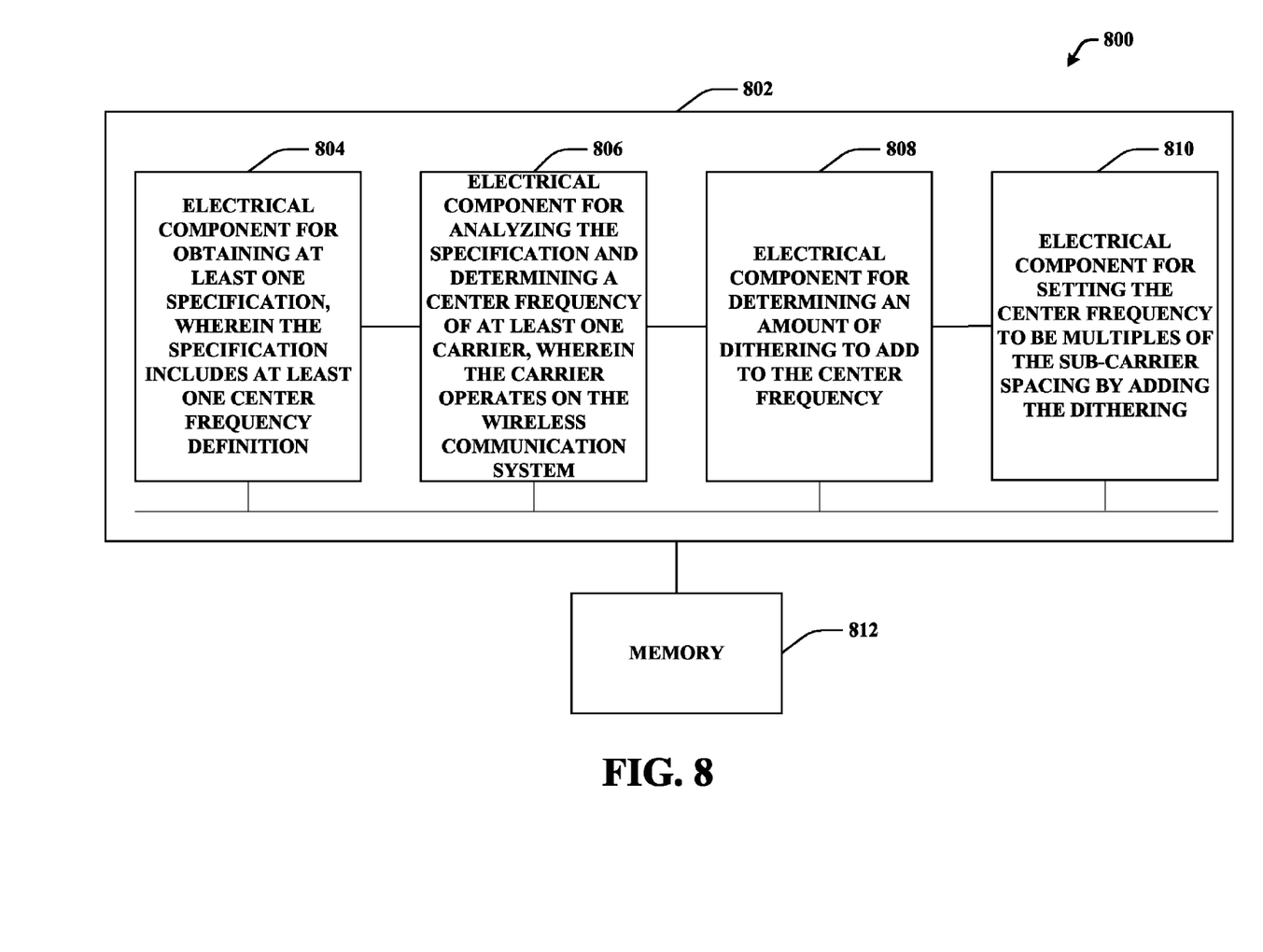
FIG. 8 is an illustration of an example system that facilitates optimizing intra-base station handover in accordance with an aspect of the subject specification.

With reference to FIG. 8, illustrated is a system 800 that facilitates center frequency control for wireless transmission. For example, system 800 can reside at least partially within a base station, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for obtaining at least one specification, wherein the specification includes at least one center frequency definition 804. Further, logical grouping 802 can comprise an electrical component for analyzing the specification and determining a center frequency of at least one carrier, wherein the carrier operates on the wireless communication system 806. Moreover, logical grouping 802 can comprise an electrical component for determining an amount of dithering to add to the center frequency 808. Also, logical grouping 802 can include an electrical component for setting the center frequency to be multiples of the sub-carrier spacing by adding the dithering 810. Additionally, system 800 can include a memory 812 that retains instructions for executing functions associated with electrical components 804, 806, 808, and 810. While shown as being external to memory 812, it is to be understood that one or more of electrical components 804, 806, 808, and 810 can exist within memory 812.

Figure 9:
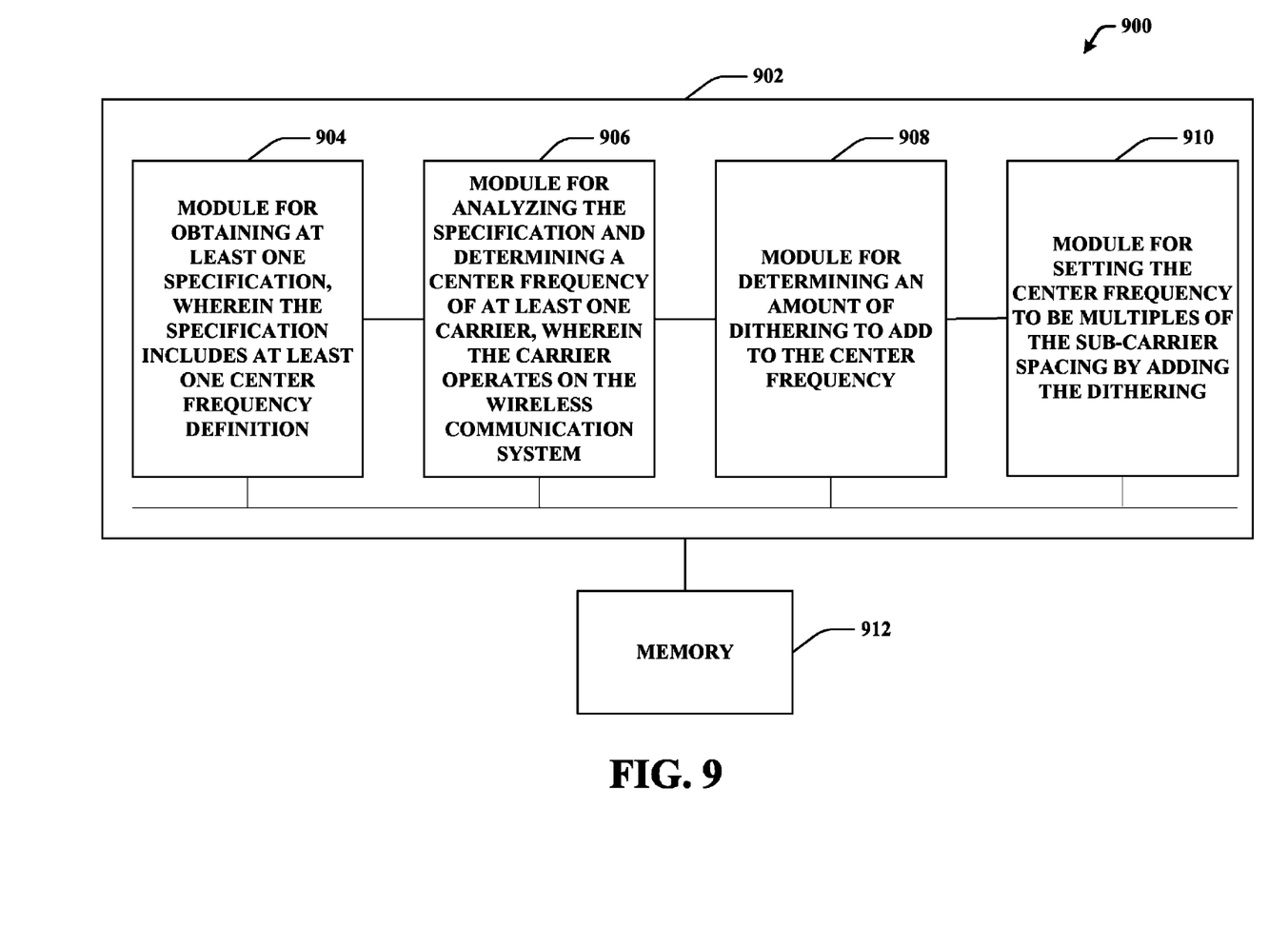
FIG. 9 is an illustration of an example system that facilitates optimizing intra-base station handover in accordance with an aspect of the subject specification.

With reference to FIG. 9, illustrated is a system 900 that facilitates center frequency control for wireless transmission. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of modules that can act in conjunction. For instance, logical grouping 902 can include a module for obtaining at least one specification, wherein the specification includes at least one center frequency definition 904. Further, logical grouping 902 can comprise a module for analyzing the specification and determining a center frequency of at least one carrier, wherein the carrier operates on the wireless communication system 906. Moreover, logical grouping 902 can comprise a module for determining an amount of dithering to add to the center frequency 908. Also, logical grouping 902 can include a module for setting the center frequency to be multiples of the sub-carrier spacing by adding the dithering 910. Additionally, system 900 can include a memory 912 that retains instructions for executing functions associated with modules 904, 906, 908, and 910. While shown as being external to memory 912, it is to be understood that one or more of modules 904, 906, 908, and 910 can exist within memory 912.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method used in wireless communications, comprising:
obtaining at least one specification including a center frequency definition;
determining, based on the specification, a center frequency of at least one carrier used to operate on a first wireless communication system;
determining an amount of dithering to add to the center frequency;
setting a value corresponding to the center frequency to be multiples of a value corresponding to sub-carrier spacing by adding the dithering; and
wherein a single FFT is used in a second wireless communication system to demodulate the at least one carrier used by the first wireless communication system,
wherein the amount of dithering is added such that each carrier of the first wireless communication system can be modulated or demodulated by a device operating in the first wireless communication system without knowledge of the amount of dithering.

2. The method of claim 1, wherein said determining the amount of dithering to add to the center frequency is performed using the equation: $CF=\text{round}((f_{cn}-f_o)/f_{cs})*f_{cs}+f_o$, wherein $f_{cn}$ is the center frequency of an original channel number, $f_o$ is the frequency offset, and $f_{cs}$ is the sub-carrier spacing.

3. The method of claim 1, wherein said setting the center frequency is performed to obtain backwards compatibility with at least one legacy system.

4. The method of claim 3, wherein the legacy systems include at least one of a GSM/WCDMA network, CDMA2000 1x network, or an EV/DO network.

5. The method of claim 1, wherein the carrier spacing is at least one of: 15 KHz for a $3^{rd}$ Generation Partnership Project (3GPP) Long Term Evolution (LTE) network system, or 9.6 KHz for a $3^{rd}$ Generation Partnership Project 2 (3gpp2) Ultra Mobile Broadband (UMB) network.

6. The method according to claim 1, wherein a device operating in the second wireless communication system uses the single FFT.

7. A wireless communication apparatus, comprising:
at least one processor configured to
obtain at least one specification including a center frequency definition, determine, based on the specification, a center frequency of at least one carrier used to operate on a first wireless communication system, determine an amount of dithering to add to the center frequency, and
set the center frequency to e multiples of sub-carrier spacing by adding the dithering; and
a memory coupled to the at least one processor, wherein the at least one processor is configured to use a single FFT to demodulate the at least one carrier to operate in a second first wireless communication system, wherein the amount of dithering is added such that each carrier of the first wireless communication system can be modulated or demodulated by a wireless communication apparatus that operates in the first wireless communication system without knowledge of the amount of dithering.

8. The wireless communication apparatus of claim 7, wherein the at least one processor is further configured to control dithering using the equation: $CF=\text{round}((f_{cn}-f_o)/f_{cs})*f_{cs}+f_o$, wherein $f_{cn}$ is the center frequency of an original channel number, $f_o$ is the frequency offset, and $f_{cs}$ is the sub-carrier spacing.

9. The apparatus of claim 7, wherein the at least one processor sets the center frequency to obtain backwards compatibility with at least one legacy system.

10. The apparatus of claim 9, wherein the legacy systems include at least one of a GSM/WCDMA network, CDMA2000 1x network, or an EV/DO network.

11. The apparatus of claim 7, wherein the carrier spacing is at least one of: 15 KHz for a 3$^{rd}$ Generation Partnership Project (3GPP) Long Term Evolution (LTE) network system, or 9.6 KHz for a 3$^{rd}$ Generation Partnership Project 2 (3gpp2) Ultra Mobile Broadband (UMB) network.

12. A wireless communication apparatus, comprising:
means for obtaining at least one specification, wherein the specification includes at least one center frequency definition;
means for analyzing the specification and determining a center frequency of at least one carrier, wherein the carrier operates on a first wireless communication system;
means for determining an amount of dithering to add to the center frequency;
means for setting a value corresponding to the center frequency to be multiples of a value corresponding to of the sub-carrier spacing by adding the dithering; and
means for using a single FFT to demodulate the at least one carrier to operate in a second wireless communication system,
wherein the amount of dithering is added such that each carrier of the first wireless communication system can be modulated or demodulated by a wireless communication apparatus that operates in the first wireless communication system without knowledge of the amount of dithering.

13. The apparatus of claim 12, further comprising means for controlling dithering using the equation: $CF=\text{round}((f_{cn}-f_o)/f_{cs})*f_{cs}+f_o$, wherein $f_{cn}$ is the center frequency of an original channel number, $f_o$ is the frequency offset, and $f_{cs}$ is the sub-carrier spacing.

14. The apparatus of claim 12, further comprising setting the center frequency to obtain backwards compatibility with at least one legacy system.

15. The apparatus of claim 14, wherein the legacy systems include at least one of a GSM/WCDMA network, CDMA2000 1x network, or an EV/DO network.

16. The apparatus of claim 12, wherein the carrier spacing is at least one of: 15 KHz for a 3$^{rd}$ Generation Partnership Project (3GPP) Long Term Evolution (LTE) network system, or 9.6 KHz for a 3$^{rd}$ Generation Partnership Project 2 (3gpp2) Ultra Mobile Broadband (UMB) network.

17. A non-transitory computer readable medium storing computer program product, comprising:

a first set of codes for causing at least one computer to obtain at least one specification, wherein the specification includes at least one center frequency definition;
a second set of codes for causing the at least one computer to analyze the specification and determining a center frequency of at least one carrier, wherein the at least one carrier operates on a first wireless communication system;
a third set of codes for causing the at least one computer to determine an amount of dithering to add to the center frequency;
a fourth set of codes for causing the at least one computer to set a value corresponding to the center frequency to be multiples of a value corresponding to the sub-carrier spacing based at least in part on adding the dithering; and
a fifth set of codes for using a single FFT to demodulate the at least one carrier by a wireless communications apparatus operating in a second wireless communication system,
wherein the amount of dithering is added such that each carrier of the first wireless communication system can be modulated or demodulated by a wireless communication apparatus operating in the first wireless communication system without knowledge of the amount of dithering.

18. The non-transitory computer readable medium of claim 17, wherein the third set of codes causes the at least one computer to determine the dithering using the equation: $CF=\text{round}((f_{cn}-f_o)/f_{cs})*f_{cs}+f_o$, wherein $f_{cn}$ is the center frequency of an original channel number, $f_o$ is the frequency offset, and $f_{cs}$ is the sub-carrier spacing.

19. The non-transitory computer readable medium of claim 17, wherein the fourth set of codes causes the at least one computer to set the center frequency to obtain backwards compatibility with at least one legacy system.

20. The non-transitory computer readable medium of claim 19, wherein the legacy systems include at least one of a GSM/WCDMA network, CDMA2000 1x network, or an EV/DO network.

21. The non-transitory computer readable medium of claim 17, wherein the carrier spacing is at least one of: 15 KHz for a 3$^{rd}$ Generation Partnership Project (3GPP) Long Term Evolution (LTE) network system, or 9.6 KHz for a 3$^{rd}$ Generation Partnership Project 2 (3gpp2) Ultra Mobile Broadband (UMB) network.

22. At least one processor configured to facilitate wireless communications, the at least one processor configured to execute computer program code stored on a non-transitory computer readable medium, the at least one processor comprising:
a first module for obtaining at least one specification including a center frequency definition;
a second module for determining, based on the specification, a center frequency of at least one carrier used to operate on a first wireless communication system;
a third module for determining an amount of dithering to add to the center frequency;
a fourth module for setting a value corresponding to the center frequency to be multiples of a value corresponding to sub-carrier spacing by adding the dithering; and
a fifth module for using a single FFT to demodulate that at least one carrier by a wireless communications apparatus operating in a second wireless communication system,
wherein the amount of dithering is added such that each carrier of the first wireless communication system can be modulated or demodulated by a wireless communication apparatus operating in the first wireless communications system without knowledge of the amount of dithering.

23. The processor of claim 22, wherein the third module determines the amount of dithering to add to the center frequency is performed using the equation: $CF=\text{round}((f_{cn}-f_o)/f_{cs})*f_{cs}+f_o$, wherein $f_{cn}$ is the center frequency of an original channel number, $f_o$ is the frequency offset, and $f_{cs}$ is the sub-carrier spacing.

24. The processor of claim 22, wherein the fourth module sets the center frequency to obtain backwards compatibility with at least legacy system.

25. The processor of claim 24, wherein the legacy systems include at least one of a GSM/WCDMA network, CDMA2000 1x network, or an EV/DO network.

26. The processor of claim 22, wherein the carrier spacing is at least one of: 15 KHz for a $3^{rd}$ Generation Partnership Project (3GPP) Long Term Evolution (LTE) network system, or 9.6 KHz for a $3^{rd}$ Generation Partnership Project 2 (3gpp2) Ultra Mobile Broadband (UMB) network.

27. A method used in wireless communications, comprising:

obtaining at least one specification including a center frequency definition;

determining, based on the specification, center frequencies of at least two carriers used to operate on a first wireless communication system;

determining the amount of ditherings to add to the center frequencies;

setting values corresponding to the center frequencies to be multiples of a value corresponding to sub-carrier spacing by adding the ditherings; and using, by a wireless device operating in a second wireless communication system, a single FFT to demodulate the at least two carriers used by the first wireless communication system, wherein the amount of ditherings is set such that each carrier of the first wireless communication system can be modulated or demodulated by the first wireless communication system devices without knowledge of the amount of ditherings.

28. The method according to claim 27, wherein the first communication system corresponds to multiple single carrier orthogonal frequency-division multiplexing (OFDM) systems and the second communication system corresponds to a multicarrier orthogonal frequency-division multiplexing (OFDM) system.

\* \* \* \* \*